(12) United States Patent
Weber et al.

(10) Patent No.: US 6,462,445 B1
(45) Date of Patent: Oct. 8, 2002

(54) ELECTROMOTIVE DRIVE, ESPECIALLY A POWER WINDOW DRIVE FOR A MOTOR VEHICLE

(75) Inventors: Matthias Weber, Baden-Baden; Mathis Raecke, Karlsruhe; Robert Hessdoerfer, Karlstadt-Stetten; Martin Hager, Buehlertal; Friedrich-Wilhelm Dreier, Sinzheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/674,448

(22) PCT Filed: Oct. 29, 1999

(86) PCT No.: PCT/DE99/03464

§ 371 (c)(1),
(2), (4) Date: Jan. 22, 2001

(87) PCT Pub. No.: WO00/54393

PCT Pub. Date: Sep. 14, 2000

(30) Foreign Application Priority Data

Mar. 9, 1999 (DE) .......................................... 199 10 193

(51) Int. Cl.⁷ .......................... H02K 5/00; H02K 11/00
(52) U.S. Cl. ............................................ 310/91; 310/89
(58) Field of Search ............................. 310/42, 89, 83, 310/91, 71, 68 R; 29/596–598

(56) References Cited

U.S. PATENT DOCUMENTS

| | | | |
|---|---|---|---|
| 5,063,317 A | 11/1991 | Bruhn | |
| 5,140,207 A | * 8/1992 | Baumeister et al. | 310/83 |
| 5,382,857 A | 1/1995 | Sesselmann | |
| 5,453,649 A | * 9/1995 | Blanchet | 310/71 |

FOREIGN PATENT DOCUMENTS

| | | |
|---|---|---|
| DE | 38 23 350 A | 1/1990 |
| DE | 43 37 390 A | 4/1995 |
| EP | 0 945 961 A | 9/1999 |

* cited by examiner

Primary Examiner—Tran Nguyen
(74) Attorney, Agent, or Firm—Michael J. Striker

(57) ABSTRACT

An electric motor drive mechanism, in particular a power-window drive for a motor vehicle, with an electric motor (10) and a set of motor electronics (14) connected with it that are encompassed by an electronics housing (20), as well as a securing device (16), which supports the electronics housing (20) in relation to a pole pot (22) of electric motor (10).

The proposal is that the securing device (16) have a guide (26) for connection to an opposing guide (38) disposed on the electronics housing (20) and have the ability to engage in detent fashion with the drive mechanism.

13 Claims, 4 Drawing Sheets

ELECTROMOTIVE DRIVE, ESPECIALLY A POWER WINDOW DRIVE FOR A MOTOR VEHICLE

PRIOR ART

The invention relates to an electric motor drive mechanism, in particular a power-window drive for a motor vehicle, according to the preamble to the main claim.

Electric motor drive mechanisms are generally known, wherein particularly in the automotive field, they can be used to adjust numerous vehicle components. This relates, for example, to the adjustment of vehicle seats, windows, and sliding sunroofs or also to the adjustment of mirrors. As a rule, the drive mechanisms used have an electric motor and a transmission connected to it, as well as a set of control and power supply electronics. These electronics are mounted on a plate which is accommodated in an electronics housing. During installation, the electronics housing is slid onto a transmission housing part and affixed to it. Depending on the length of the electronics housing part, considerable transverse loads can impinge on the electronics housing during operation, which can lead to a detachment of the connection to the transmission housing or to breakage of the electronics housing. For this reason, long electronics housings are affixed and secured at another point in relation to the electric motor drive mechanism. This can be achieved, for example, by means of a securing device which on one side, is connected to a pole pot of the electric motor and on the other side, encloses the electronics housing and consequently supports this housing in relation to the pole pot.

In this connection, it is disadvantageous that in an intermediary assembly step before the mounting of the electronics, the securing device must be mounted to the pole pot of electric motor and is then connected to the motor. Securing devices of this kind must be especially adapted to the geometry of electronics housing, which is why the use of a different set electronics also requires the installation of a different securing device. However, a subsequent modification, for example, is difficult because the securing device cannot be easily detached. Furthermore, the securing brackets connected to the pole pot housing further complicate the subsequent removal of the electronics, for example in order to carry out maintenance on the electric motor drive mechanism or a replacement of the electronics housing.

Consequently, the flexibility of the electric motor drive mechanism is sharply limited through the use of this securing device, particularly with regard to the use of different electronics and the subsequent removal of electronics once they have been installed.

ADVANTAGES OF THE INVENTION

The electric motor drive mechanism according to the invention, with the features of the main claim, has the advantage that the securing device for supporting the electronics housing can be universally used for various electronics housings. Another decisive advantage is produced in that the securing device can be installed in a final installation step and can be removed again at any time with no damage. This is achieved essentially by means of a guide on the securing device which is connected to an opposing guide disposed on the electronics housing. As a result, the securing device is particularly embodied so that it can also be inserted later.

Advantageous improvements of the invention according to the main claim are possible by means of the measures disclosed in the dependent claims.

It is therefore advantageous if the guide is disposed on a center part of the securing device, along the pole pot. As a result, the electronics housing can be optimally supported in relation to the pole pot housing and lateral forces acting on the electronics housing can be absorbed. These lateral forces occur, for example, when disconnecting a plug connected to the electronics, in a vibration test, or under other mechanical stresses. Particularly with a long electronics housing, the stress resulting from the torques occurring can be reduced in this manner.

If the guide of the securing device is comprised of two opposing ribs that form a T groove and are disposed along the center part, then a particularly simple, convenient, and reliable installation of the securing bracket is assured. However, the ribs do not absolutely have to form a T groove; they can, for example, also produce a dovetail guide or the like. It is only crucial that the securing device have the ability to slide between the pole pot housing and electronics housing and that the securing device be securely connected to the electronics housing.

It is also advantageous if the securing device has a detent engagement device which produces a connection with a brush holder associated with the electric motor. If the detent engagement device is comprised of a detent element which is provided with a detent hook on its free end, then this makes it possible for the securing device with this detent hook to securely engage in detent fashion in a detent hook receptacle integrated into the brush holder.

If the detent hook receptacle has a stepped end face, then the securing device can be advantageously installed so that it is free of longitudinal play.

In order to produce a connection between the pole pot housing and the securing device, which can be slid between the pole pot housing and electronics housing, a recess is required which is disposed on a receptacle part that is associated with the center part of the securing device. If the recess in the receptacle part is comprised of a circular opening, then a cylindrical projection on the free end of the pole pot can advantageously be received.

However, the recess of the receptacle part can also have different, arbitrary geometric forms. It is only important that it permit the securing device to be optimally connected to the pole pot of the electric motor.

DRAWINGS

An exemplary embodiment of an electric motor drive mechanism according to the invention is shown in the drawings and will be explained in detail in the subsequent description.

DESCRIPTION OF THE EXEMPLARY EMBODIMENT

Figure 1:
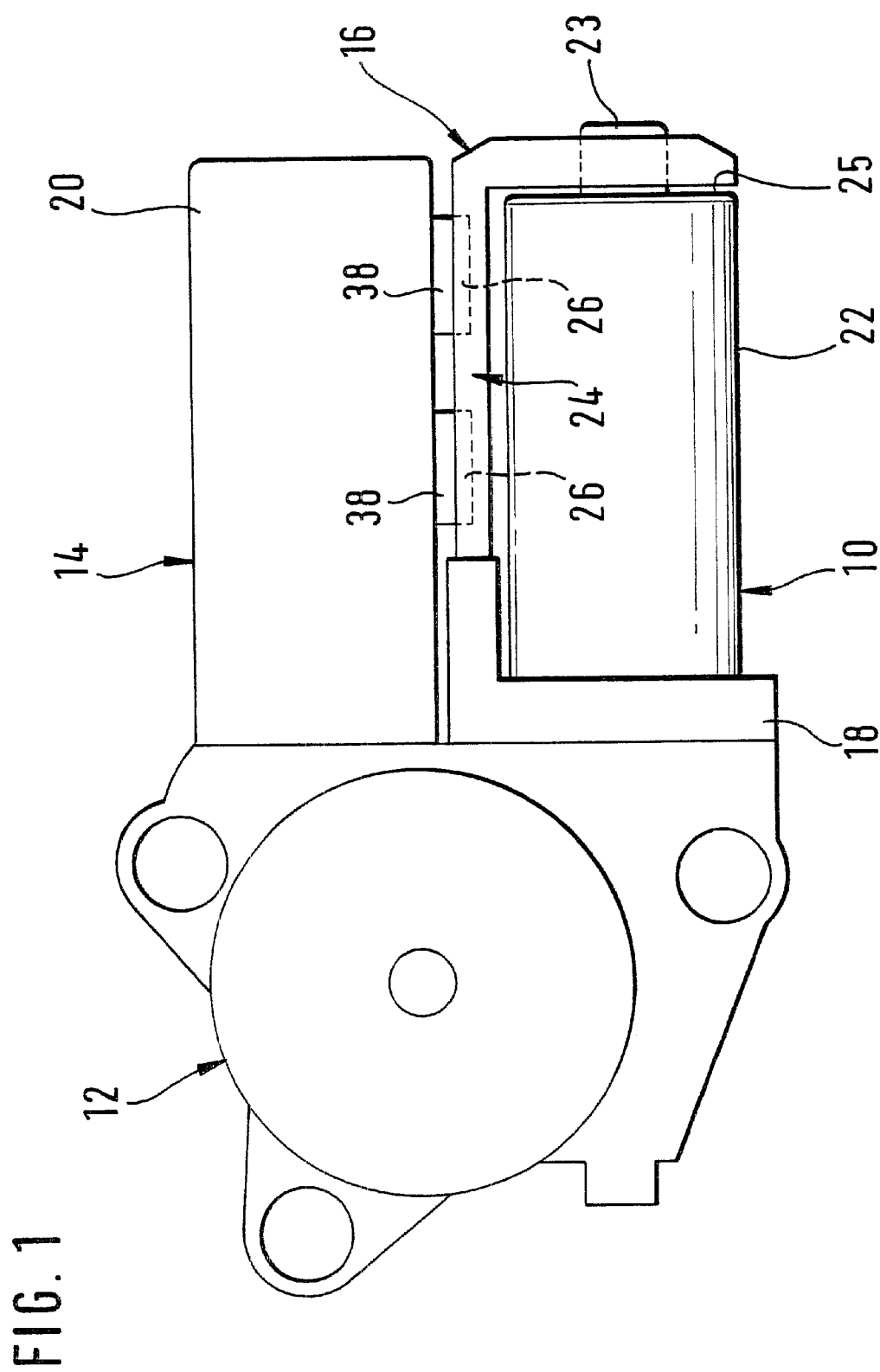
FIG. 1 is a schematic representation of an electric motor drive mechanism.

The exemplary embodiment depicted in FIG. 1 shows an electric motor drive mechanism according to the invention, in particular a power-window drive for a motor vehicle, with an electric motor 10, a transmission 12, and a set of motor electronics 14. A securing device 16 is disposed between an electronics housing 20 and pole pot 22 of electric motor 10.

With its end oriented toward the transmission 12, the securing device 16 protrudes into a brush holder 18. The end of the securing device 16 remote from the transmission 12 is secured to a cylindrical projection 23 of the pole pot 22. Through the disposition of a guide 26 affixed to the securing device 16, the center part 24 of the securing device 16 is connected to an opposing guide 38 affixed to the electronics housing 20. This disposition, which is embodied essentially in the form of a T groove, assures that the securing device, which supports the electronics housing in relation to the pole pot 22, can be installed or removed at any time with no damage.

Figure 2:
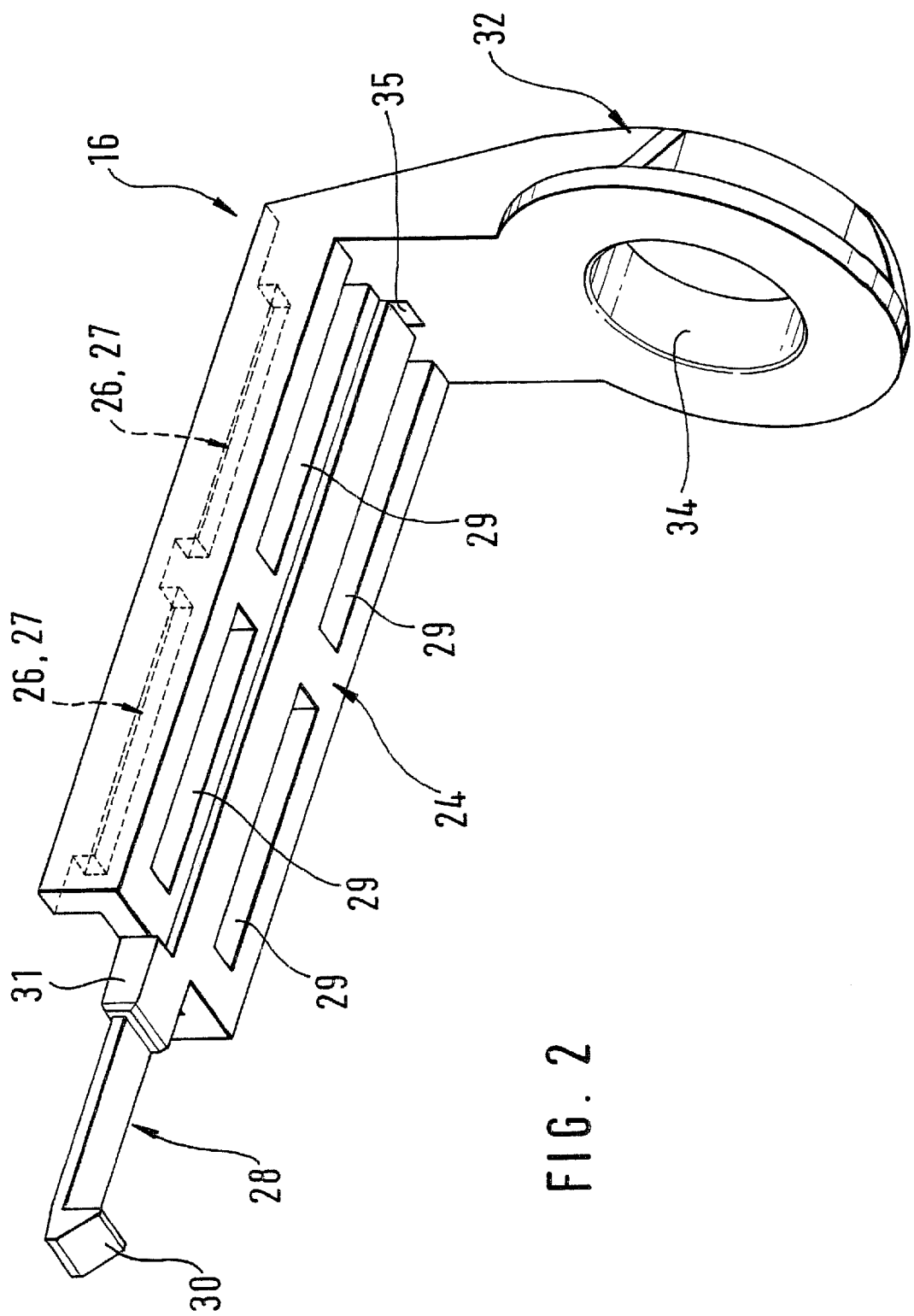
FIG. 2 is a perspective view of a possible securing device as part of the electric motor drive mechanism.

FIG. 2 is a perspective depiction of an exemplary embodiment of the securing device 16 of the electric motor drive mechanism according to the invention. Here, as well as in the following figs., the same features are provided with the same reference numerals.

The securing device 16 is comprised of a receptacle part 32, a center part 24, and a detent engagement device 28. On its free end, the detent engagement device 28 is provided with a detent hook 30 which is used to fix the securing device 16 in the brush holder 18 shown in FIG. 1. In order to precisely position the securing device 16, the detent engagement device 28 is provided with a pin 31, which is shaped so that when the securing device 16 is installed, this pin fits into an opening 19 of the brush holder 18 shown in FIG. 3 and partially rests against its internal surface 21.

The center part 24 of the securing device 16 is provided with ribs 27 in the form of a T groove, would constitute the guide 26 and produce a connection to the opposing guide 38 of the electronics housing 20.

The recesses 29 on the center part 24 of the securing device 16 have no significance to the function of the securing device, they are required for technical manufacturing reasons and also contribute to a weight reduction.

The center part 24 of the securing device 16 is adjoined by a receptacle part 32, which is disposed essentially perpendicular to the center part 24. This receptacle part 32 has a recess 34 and is constituted by means of a circular opening for receiving the cylindrical projection 23 of the pole pot 22.

Between the center part 24 and the receptacle part 32, there is a removal opening 35, which facilitates the removal of the securing device 16. A tool can be inserted through the removal opening 35 in order to detach the connection shown in FIGS. 3 and 4 between the detent hook 30 and the detent hook receptacle 36.

Figure 3:
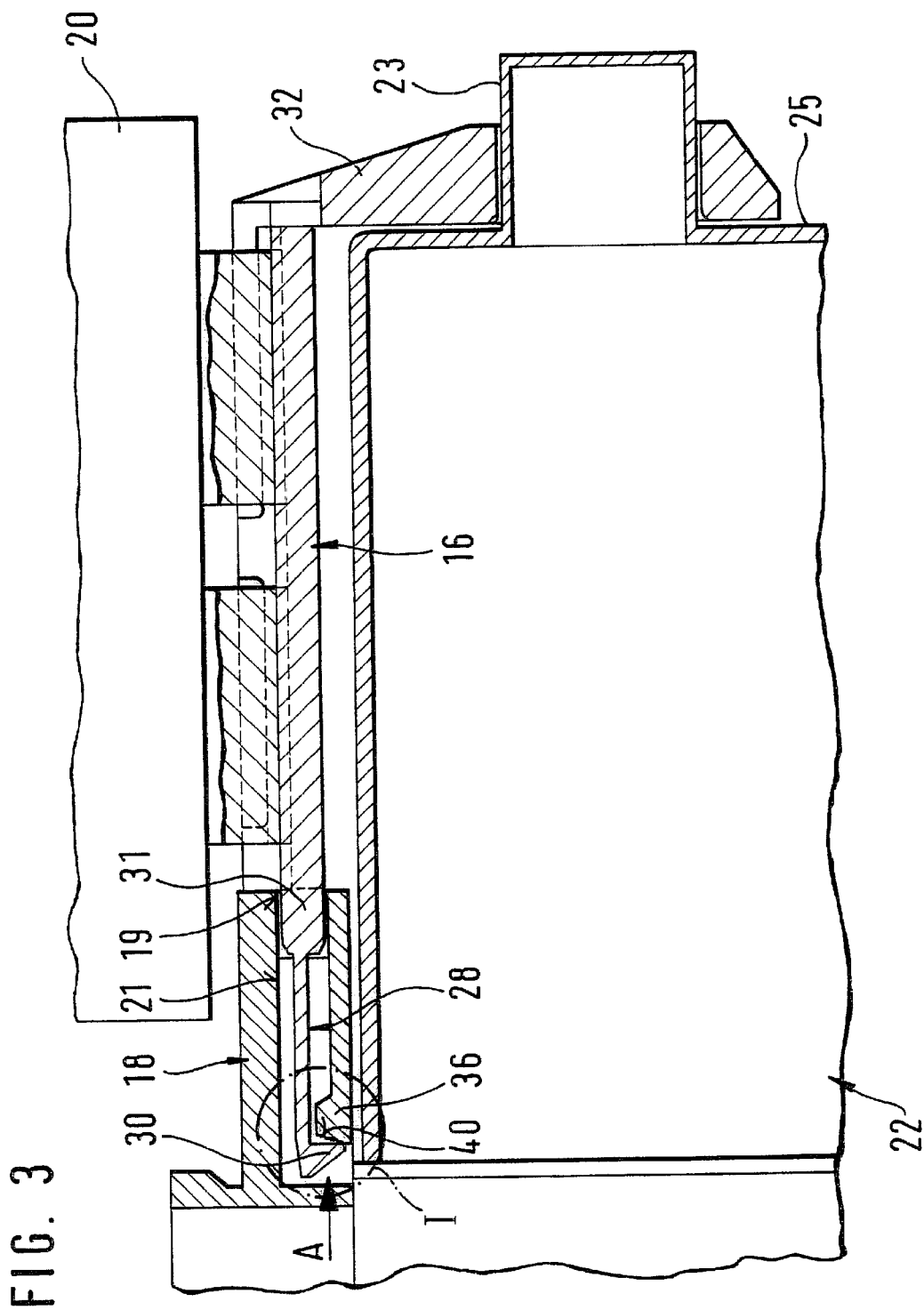
FIG. 3 is a partial section through FIG. 1.

The partial section through FIG. 1 that is shown in FIG. 3 depicts the securing device 16, together with a part of the electronics housing 20 and a part of the pole pot 22, in the installed position. A part of the brush holder 18 is also shown, which has a detent hook receptacle 36 incorporated into it for detent engagement with the detent hook 30 in a manner that is free of longitudinal play.

Figure 4:
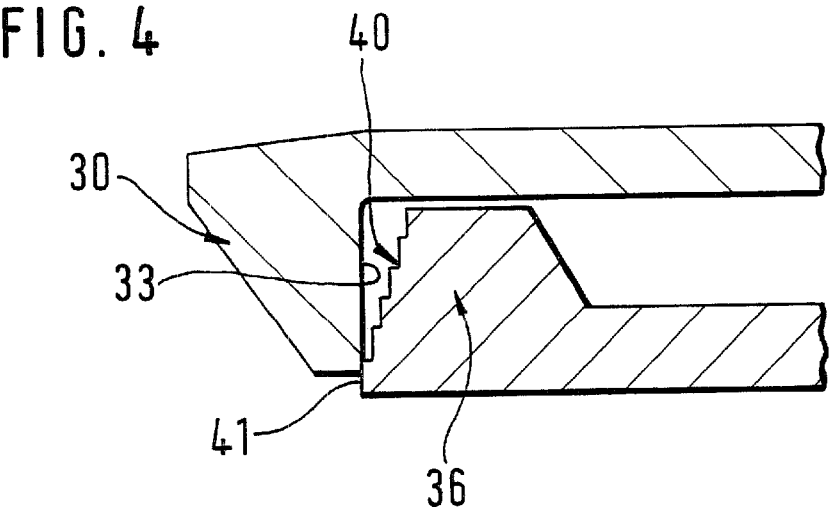
FIG. 4 is an enlarged depiction of the region I in FIG. 3.

To this end, the detent hook receptacle 36 has a stepped end face 40, which can be seen in the enlargement in FIG. 4. The surface 33 of the detent hook 30 oriented toward the stepped end face can be brought into contact with one of the steps 41 so that it is possible for there to be a detent connection of the securing device 16 that is free of longitudinal play.

Figure 5:
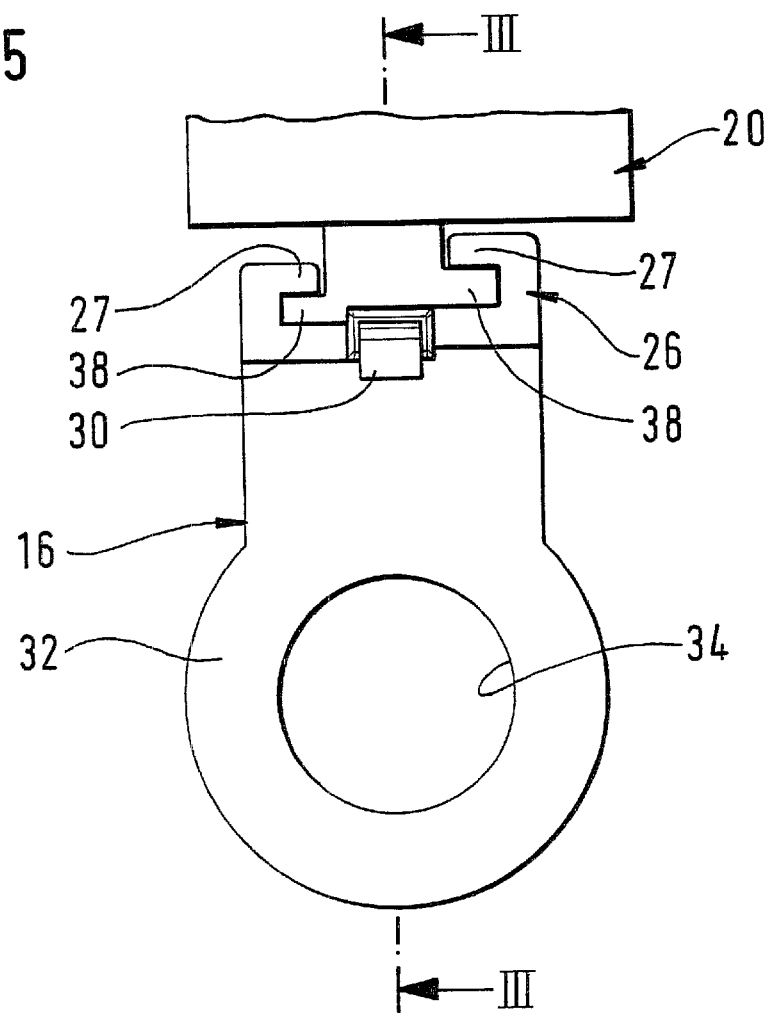
FIG. 5 is a view in the direction of the arrow A in FIG. 3.

FIG. 5 is a detailed depiction of a possible connection between the securing device 16 and the electronics housing 20. The securing device 16 has the guide 26 in which the two opposing ribs 27 are disposed in the form of a T groove. These ribs in the form of a T groove enclose an opposing guide 38 disposed on the electronics housing 20 and thus affix the securing device 16 to the electronics housing 20.

At the same time, this construction permits the securing device 16 to slide in the direction along the center part 24, which permits an advantageous installation and removal of the securing device 16, particularly also with regard to the sequence of the individual insulation steps.

What is claimed is:

1. An electric motor drive mechanism with an electric motor (10) which is connected with motor electronics (14) that are encompassed by an electronics housing (20), as well as a securing device (16), which supports the electronics housing (20) in relation to a pole pot (22) of the electric motor (10), characterized in that the securing device (16) has a guide (26) along the pole pot for connection to an opposing guide (38) disposed on the electronics housing (20) and can engage in detent fashion with the drive mechanism, wherein the securing device (16) is formed so as to be insertable after assembly of the electronics housing (20).

2. The electric motor drive mechanism according to claim 1, characterized in that the guide (26) is disposed on a center part (24) of the securing device (16), along the pole pot (22).

3. The electric motor drive mechanism according to claim 2, characterized in that the guide (26) is comprised of two opposing ribs (27) which form a T groove and are disposed along the center part (24).

4. The electric motor drive mechanism according to claim 1, characterized in that the securing device (16) has a detent engagement device (28) for connection to a brush holder (18) associated with the electric motor (10).

5. The electric motor drive mechanism according to claim 4, characterized in that the detent engagement device (28) is provided with a detent hook (30) on its free end.

6. The electric motor drive mechanism according to claim 4, characterized in that the detent engagement device (28) is provided with a pin (31) for precisely positioning the securing device (16).

7. The electric motor drive mechanism according to claim 6, characterized in that the detent hook (30) can engage in detent fashion in a detent hook receptacle (36) integrated into a brush holder (18).

8. The electric motor drive mechanism according to claim 7, characterized in that the detent hook receptacle (36) has a stepped end face (40) in order to produce a detent engagement with the detent hook (30) that is free of longitudinal play.

9. The electric motor drive mechanism according to claim 1, characterized in that the securing device (16) has a recess (34) for connection to a free end of the pole pot (22).

10. The electric motor drive mechanism according to claim 9, characterized in that the recess (34) is disposed on a receptacle part (32) that is associated with the center part (24) and is disposed essentially perpendicular to the center part (24).

11. The electric motor drive mechanism according to claim 9, characterized in that the recess (34) in the receptacle part (32) is constituted by a circular opening for receiving a cylindrical projection (23) of the pole pot (22).

12. An electric motor drive mechanism with an electric motor (10) which is connected with motor electronics (14) that are encompassed by an electronics housing (20), as well as a securing device (16), which supports the electronics housing (20) in relation to a pole pot (22) of the electric motor (10), characterized in that the securing device (16) has a guide (26) for connection to an opposing guide (38)

disposed on the electronics housing (20) and can engage in detent fashion with the drive mechanism, wherein the guide (26) is comprised of two opposing ribs (27) which form a T groove and are disposed along a center part (24) of the securing device (16).

13. An electric motor drive mechanism with an electric motor (10) which is connected with motor electronics (14) that are encompassed by an electronics housing (20), as well as a securing device (16), which supports the electronics housing (20) in relation to a pole pot (22) of the electric motor (10), characterized in that the securing device (16) has a guide (26) for connection to an opposing guide (38) disposed on the electronics housing (20) and can engage in detent fashion with the drive mechanism, wherein the securing device (16) has a detent engagement device (28) for connection to a brush holder (18) associated with the electric motor (10).

* * * * *